Aug. 6, 1940.    W. L. HAGER    2,210,534
PRESSURE GAUGE FOR PNEUMATIC TIRES
Filed Oct. 30, 1937    2 Sheets-Sheet 1

Inventor
W. L. Hager

Aug. 6, 1940.  W. L. HAGER  2,210,534
PRESSURE GAUGE FOR PNEUMATIC TIRES
Filed Oct. 30, 1937  2 Sheets-Sheet 2
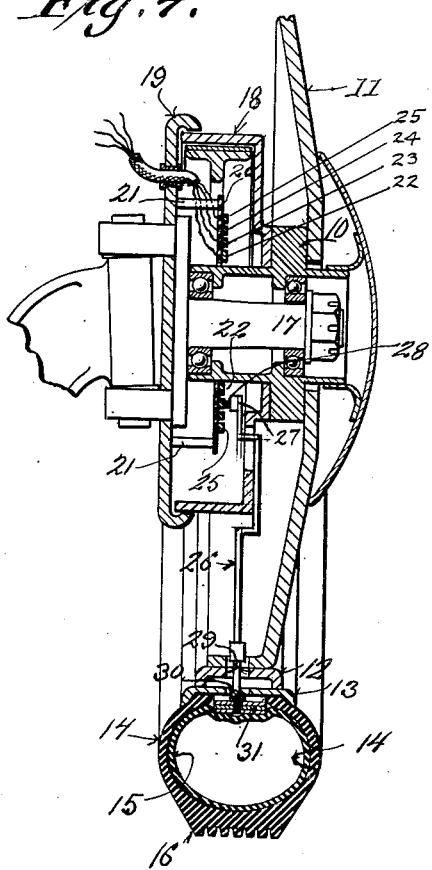
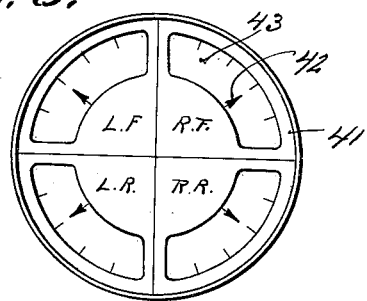
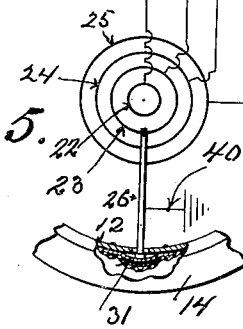
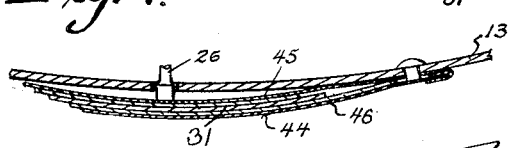

Patented Aug. 6, 1940

2,210,534

UNITED STATES PATENT OFFICE 2,210,534

PRESSURE GAUGE FOR PNEUMATIC TIRES

Willard L. Hager, Oshkosh, Wis.

Application October 30, 1937, Serial No. 171,963

1 Claim. (Cl. 200—58)

This invention appertains to motor vehicles, and more particularly to a novel attachment or appliance for motor vehicles, such as automobiles, aeroplanes, and the like, to indicate the condition of their pneumatic tires.

One of the primary objects of my invention is to provide novel means on the instrument board of an aeroplane or automobile for indicating to the driver of the vehicle at all times the exact condition of each pneumatic tire, whereby the driver can instantly take the necessary precaution in case a tire is below a desired pressure.

Another salient object of my invention is to provide a series of spaced, insulated conducting rings, held against movement and disposed axially about a wheel spindle, with a contact brush carried by a wheel and movable from one conducting ring to the other by the pressure of the air in the vehicle tire, the different rings being adapted to be electrically connected to suitable signal or indicating means on the instrument panel of the vehicle by the brush, a separate indicator being provided for each tire.

A further important object of my invention is to provide means whereby the attachment can be incorporated with the rims and tires of a vehicle without any change in the standard construction thereof.

A still further object of my invention is to provide a novel indicator of the above character, which will be durable and efficient in use, one that will be simple and easy to manufacture, and one which can be placed upon the market at a low cost.

With these and other objects in view, the invention consists in the novel construction, arrangement, and formation of parts, as will be hereinafter more specifically described, claimed, and illustrated in the accompanying drawings, in which drawings:

Figure 4 is a fragmentary diametric, sectional view through a vehicle wheel, showing the same on its axle, the view illustrating the contact brush and the electric conducting rings.

Figure 5 is a diagrammatic view, illustrating the means for electrically connecting the instrument panel signals with a wheel.

Figure 6 is a front elevational view, illustrating a modified form of indicator, which can be utilized on the instrument panel of the vehicle.

Figure 7 is a detail sectional view illustrating a modified form of spring and cover therefor.

Figure 1:
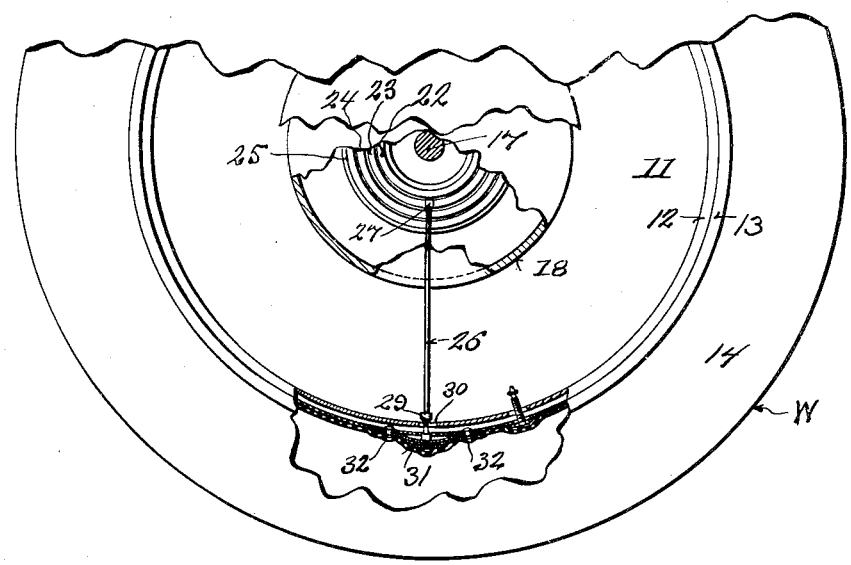
Figure 1 is a fragmentary front elevational view of a vehicle wheel showing my novel appliance incorporated therewith, parts of the wheel being shown broken away and in section to illustrate structural details.
Figure 2:
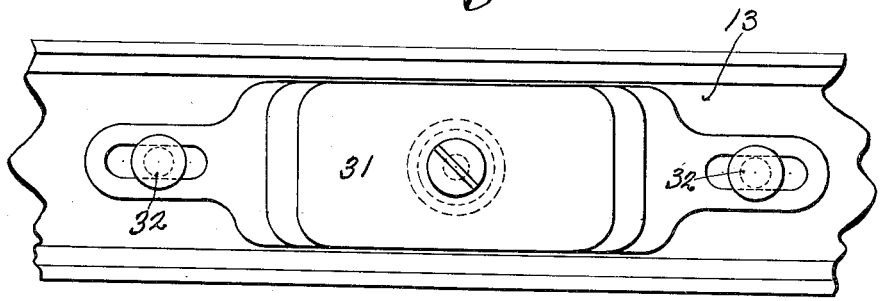
Figure 2 is an enlarged detail, fragmentary, plan view of a vehicle rim, illustrating the means of resiliently connecting the brush-operating rod with the rim.
Figure 3:
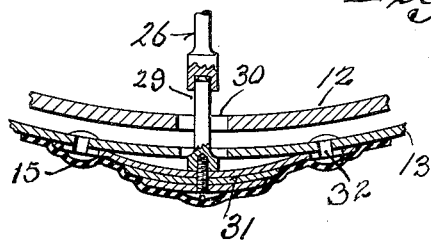
Figure 3 is a fragmentary circumferential section taken through a vehicle rim and wheel felly, showing one means employed for connecting the brush-operating rod to the resilient member utilized to act against the pressure of the inner tube.

Referring to the drawings in detail, wherein similar reference characters designate corresponding parts throughout the several views, the letter W indicates a vehicle wheel, which can be of any preferred character, make, or size. As illustrated, the wheel W includes a hub 10, having a wheel disc 11 attached thereto. The periphery of the wheel disc in turn has secured thereto the felly 12, on which is mounted a rim 13 for a pneumatic tire 14. The tire 14 is of the ordinary construction, and embodies the inner tube 15 and the casing 16. The wheel W, shown in the drawings, is of the type more particularly utilized for automobiles, but it is to be understood that the entire appliance is adapted for other vehicle uses, such as aeroplanes, and the like.

The hub 10 is rotatably mounted on a wheel spindle 17, and the wheel itself carries a brake drum 18, the cover plate 19 for which is rigidly secured to the axle.

In accordance with my invention, I apply to each wheel a disc of insulation 20, and this disc is held stationary about the wheel hub on the axle in any preferred manner. In the present instance the disc of insulation is secured by means of bolts or the like 21 to the brake covering 19. Mounted upon the outer face of the disc 20, in spaced relation to one another, are a plurality of electric conducting rings 22, 23, 24, and 25.

Carried by the wheel is a reciprocatory operating rod 26. The inner end of the rod has formed thereon, or detachably secured thereto, a head 27. This head in turn carries a wiper or electric conducting contact brush 28 for engagement with the conductor rings. The outer end of the rod 26 extends through suitable slots 29 formed in the vehicle felly and the vehicle rim, and is connected by means of a screw 30, or the like, with the central portion of a series of leaf springs 31. The innermost leaf spring has its terminals slotted for the reception of rivets or other fastening elements attached to the vehicle rim 13, as at 32. The leaf springs 31 are so positioned as to be engaged by the inner tube 15, and the tension of the leaf springs act against the pressure of the inner tube.

To facilitate the taking off of the wheel from the axle, or the rim off of the wheel, the rod 26 can be made in sections, and the joint for the sections can be disposed at the proper and desired point.

The instrument panel of the vehicle is adapted to have attached thereto, or incorporated therewith, a suitable signal or indicating means, so that the driver of the vehicle can instantly determine the pressure condition of each tire. As shown diagrammatically in Figure 5 of the drawings, an indicator member 33 can be provided. This indicator member is divided into quarters, and each quarter bears a suitable legend to indicate the tire for which it is used. Thus, one quarter of the signal can bear the words "left front," or the initials thereof, another quarter the words "right front," another quarter the words "left rear," and another quarter the words "right rear." Each quarter has mounted thereon a plurality of signal lamps 34, and these lamps correspond in number to the conducting rings carried by the brake cover. The method of wiring the signal lamps 34 for one quarter is shown diagrammatically in Figure 5, and it is to be noted that a wire 35 is brought from one terminal of each lamp, and is connected to the desired conductor ring. All of the other terminals of the lamps are connected to a main wire 36, which leads to one terminal of a battery 37, which can be the storage battery on the vehicle. A switch 38 can be incorporated in the length of the wire so that the signal can be cut off and on at the pleasure of the driver of the vehicle.

The other terminal of the battery 37 is connected to the ground by suitable wire 39. The operating rod 36, carried by each vehicle wheel, is grounded to the chassis of the vehicle by a suitable wire 40.

In operation of my improved device, when the tire is fully inflated, the pressure within the tube, acting against the leaf springs 31, pushes the rod 36 inwardly, and its contact brush will engage the contact ring 22, which will close a circuit through the indicating lamp on the dash or instrument panel, which is positioned to show a fully inflated tire. If the pressure in the inner tube decreases, then the leaf springs will move the contact brush over one of the other contact rings, which will close the circuit through one of the other indicating lamps, which will show the condition of the tire.

If desired, the lamps can be of different colors, or the dial can be provided with tire pressure readings adjacent to each lamp.

Obviously, the number of leaves in the leaf spring can be increased or decreased according to the type of pneumatic tire with which my appliance is associated.

In Figure 7, the longest leaf spring is disposed outermost and extends over the shorter leaves. As illustrated in this figure, a cover 44 can be provided for the spring, to prevent injury to the tire inner tube. This cover 44 can embody a light metal inner section 45 having bent back ends and an outer thin metal plate having its terminals received under said bent back ends.

It is to be understood that the form of dial or indicator 33 for the instrument panel is only of a diagrammatic nature, and that the same can be made in various forms and suitably ornamented and treated to present a pleasing and attractive appearance.

In Figure 6 I have shown another form of dial, which is indicated by the reference character 41. This dial or indicator is adapted to be used when magnetic indicators are employed. Thus, in the indicator 41 pointers 42 are adapted to travel over graduated dial plates 43.

Other changes in details, such as brush operating means, may be made without departing from the spirit or the scope of my invention, but what I claim as new is:

In a device for indicating the pressure of a pneumatic tire to the driver of a motor vehicle, a vehicle wheel, a pneumatic tire thereon, leaf springs carried by the outer surface of the rim of the vehicle wheel and disposed within the tire for resisting the pressure of the pneumatic tire, an operating member including a rod connected to the spring and movable therewith, a plate of insulation arranged adjacent to the wheel and held stationary relative thereto, a series of independent conductor rings mounted upon said plate, and a conductor brush carried by the rod and movable over the face of the plate from one ring to the other.

WILLARD L. HAGER.